Figure 1:
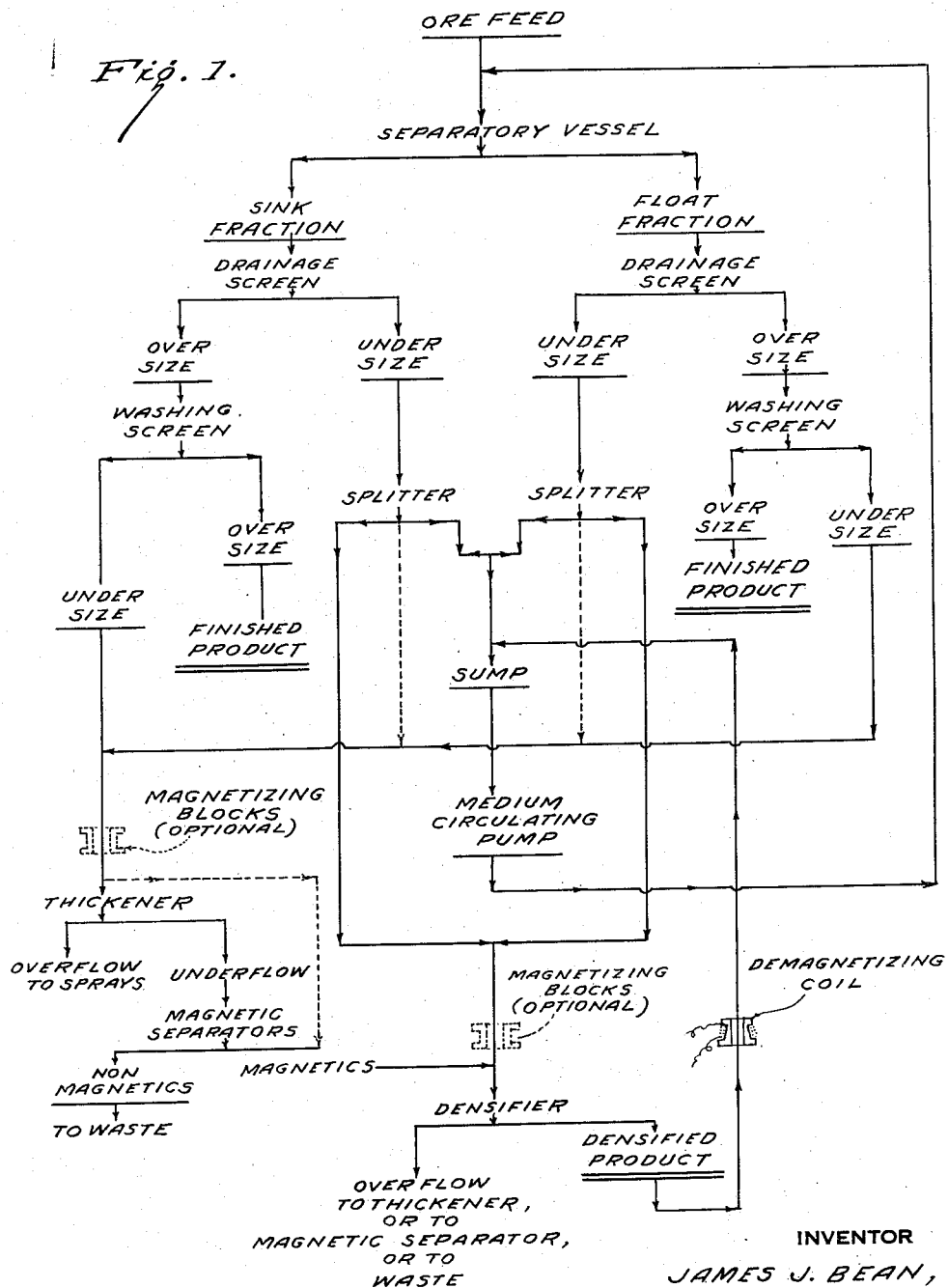

Sept. 28, 1954 J. J. BEAN 2,690,262
HEAVY MEDIA SEPARATION PROCESS
Filed May 14, 1952 2 Sheets-Sheet 1

INVENTOR
JAMES J. BEAN,
BY
ATTORNEY

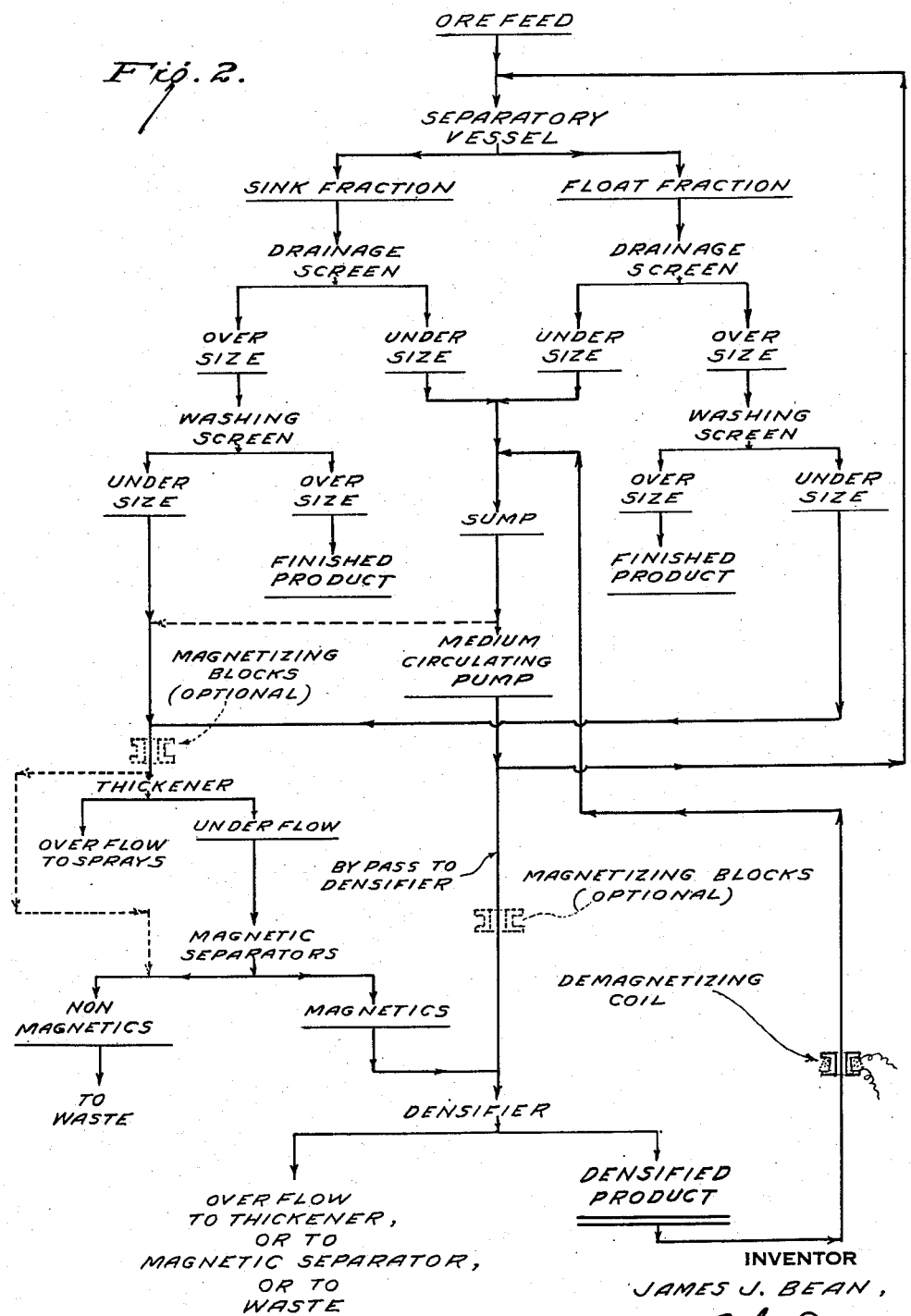

UNITED STATES PATENT OFFICE 2,690,262

HEAVY MEDIA SEPARATION PROCESS

James Joseph Bean, Riverside, Conn., assignor to American Cyanamid Company, New York, N. Y., a corporation of Maine Application May 14, 1952, Serial No. 287,676

5 Claims. (Cl. 209—172.5)

This invention relates to the separation of mixtures of solid particles having different specific gravities.

Heavy media separation processes employ as the separatory fluid suspensions in water of suitably-sized solids of relatively high specific gravity, so that a fluid medium of an apparent density greater than unity is produced. Mixtures of particles of different specific gravities are separated by immersion into such liquids, those particles having a specific gravity greater than that of the separatory fluid sink, and those particles having a specific gravity less than that of the separatory fluid float. The sink and float fractions are then separately recovered. The medium solids are separated from the collected fractions and reused, that portion of the medium which has become too dilute and too contaminated with fines and refuse to be returned directly to the separatory vessel being first cleaned by passage through a cleaning circuit before return to the vessel.

In the foregoing process, it is necessary to keep the composition of the liquid, i. e., ratio of medium solids to water, constant in order to maintain the separating gravity constant. Various medium solids, such as ferrosilicon and magnetite, have been used to produce the desired apparent density of the separatory fluid. With any particular medium solid, there is a limit on the specific gravity of the suspension that may be obtained. The upper limit is fixed by the viscosity of the fluid, and when this gets too high the particles will not settle therethrough. The lower limit is set when there are not enough medium solids in the suspension to keep them from stratifying. The fineness of subdivision of the medium solids determines the lower limit.

For the most part, the lighter medium solids are much less expensive than the heavier medium solids and, therefore, there is an economic reason for trying to use lighter solids such as magnetite instead of heavier solids such as ferrosilicon, so that a thick medium with cheaper solids is preferred from the standpoint of cost to a thin medium with the more expensive medium solids.

In the use of a thick medium where there is a high percentage of solids by volume to water, however, a serious problem has arisen where the incoming ore contains a large quantity of water, in that the wet ore adds more water than can be taken care of by the cleaning system. Moreover, the continuous introduction of added water with the ore also disturbs the hydraulic balance in the separatory vessel, with the result that inefficient separation of particles takes place.

When operating with a thick medium, it is imperative, therefore, that some means be provided for eliminating from the system this excess water brought in with the incoming ore. It is not only impractical but prohibitively expensive to increase the capacity of the cleaning system. This is true even with the modern processes which employ magnetizable medium solids wherein one or more magnetic separators in series are used to reclaim the medium solids. Magnetic separators are expensive pieces of equipment, the cost usually increasing as the size of the equipment increases, and when large flows of medium have to be passed to the cleaning circuit to rid the system of excess water, expensive installations are required. Any arrangement, therefore, which would permit the size of this equipment to be reduced would be of real economic importance.

The present invention solves the problem of handling wet ores when a volumetric dense medium is employed as the separatory fluid, in that a novel arrangement has been provided for eliminating excess water from the system. The present invention permits for the first time the handling of ores of a relatively high water content in a separatory fluid medium wherein the concentration of water by volume is so low that the water removed from the medium by cleaning that portion of the medium which passes to the washing screens is insufficient to compensate for the water continuously being introduced with the ore into the separatory vessel.

Essentially, the present invention resides in the discovery that this excess water may be eliminated from the system by sending a predetermined flow of the drainage medium direct to a dewatering operation. The amount of drainage medium which is sent to dewatering is varied so as to be sufficient to compensate for all or a substantial portion of the water coming into the separatory vessel with the ore. By this arrangement, not only are the desirable advantages of using a volumetric dense medium fully retained, but it becomes possible for the first time to handle ores having a variable and relatively high water content.

It is a further advantage of the present invention that it permits a reduction in the size of the magnetic cleaning equipment heretofore necessary, which, as pointed out hereinbefore, is a further important economic consideration.

The beneficial results of the present invention may be readily achieved by the procedure illustrated in the accompanying drawings, in which Fig. 1 represents diagrammatically a suitable flow scheme, and Fig. 2 represents a modification thereof.

Referring to Fig. 1, the feed which contains a varying and relatively high water content is introduced into the separatory vessel containing a separatory fluid of the desired specific gravity. The sink and float fractions are respectively discharged on drainage screens, from which the oversize material is passed to washing screens. The oversize material from these latter screens constitutes the finished products. The drainage screen undersize passes into two splitters, which serve to vary the flow to the densifier. The splitters may be adjusted so that the drainage screen undersize is taken from either the float or sink fractions or both. Normally, the flow direct to the densifier constitutes only a small proportion of the medium in circulation, a much larger amount being returned directly to the vessel by the medium circulating pump, as illustrated. The amount of medium which is sent directly to the densifier is varied so as to compensate for the water coming in on the wet ore. In some cases it may be desirable to pass this medium through the magnetizing device before its entry into the densifier or other dewatering device in order to assist flocculation and settling of the solids. The washing screen undersize is sent to a cleaning operation which, as illustrated, may include magnetizing blocks and a thickener, if desired, before passing into magnetic separators. Magnetizing blocks are helpful if it is desired to secure faster settling in the thickener which is located ahead of the magnetic separators. In many instances, it is desirable to pass this flow direct to the magnetic separator with or without having previously been passed through magnetizing blocks, as illustrated by the dotted line on the left hand side of Fig. 1 of the drawing. In some instances it may be desirable to send a portion of the drainage medium to the cleaning circuit together with the washings from the screens as illustrated in Fig. 1. The magnetically recovered medium is passed to the dewatering device which is illustrated as being a densifier, although obviously other equivalent dewatering means may be employed. The densified product is returned to the sump from whence it is pumped back to the separatory vessel as shown. The densified product is shown as passing through a demagnetizing coil before return to the vessel, which is the standard procedure and affords the best operating conditions. However, with certain types of separatory vessels, that is, for example, where a crude separation is made, it is possible to eliminate the demagnetizing coil.

The arrangement shown in Fig. 2 is in general similar to that described in connection with Fig. 1, except that in this flow scheme the drainage screen undersize passes directly to the sump, from whence a variable amount may be sent directly to the densifier, the remainder, excepting for a small fraction which may be sent to cleaning, being returned directly to the vessel. While, as shown in Fig. 2, the drainage screen undersize is taken off from the pump line for passage direct to the densifier and which represents a physically simpler system, the arrangement shown in Fig. 1, where a portion of the drainage screen undersize from either, or both, the float and sink fractions may be passed directly to the densifier, represents a preferred embodiment. This is true because the float drainage fraction normally contains more water and thus it is possible to remove the water more economically at this point.

By either of the illustrated flow schemes, however, the desirable results of the present invention are readily obtained, in that by varying the flow of drainage medium direct to the densifier, it is thus possible to quickly compensate for the water added to the system by the incoming wet ore and thus to obtain a controlled composition by volume of the separatory fluid.

While the invention has been described above in conjunction with the use of magnetizable medium solids, the invention may be applied with equal facility when non-magnetizable medium solids are used. In such instances, the non-magnetizable medium solids may be recovered by such means as flotation, settling, or tabling. The present invention, therefore, is in no sense limited to the use of magnetizable medium solids, although this does represent a desirable embodiment.

The operation of the process in the handling of a typical ore will be described in the following example:

*Example*

A heavy media separation plant installed to treat 175–225 tons per day of gravel at a specific gravity of 2.45 could not be operated satisfactorily at the rated tonnage without increasing the capacity of the magnetic cleaning circuit an excessive amount. At a feed rate of 200 T. P. H. each 1% moisture in the feed adds to the separatory circuit 2 tons of water per hour. Enough medium solids must be diverted, recovered and returned to the separatory circuit in the form of a thickened pulp to compensate for this moisture coming into the separatory vessel with the feed. With 2.0 T. P. H water entering the vessel with the feed it is necessary to return 16 T. P. H. of densified medium of 2.63 specific gravity to maintain the separating gravity at 2.45. 16 T. P. H. of 2.63 specific gravity medium contains 12.4 T. P. H. of magnetite solids of 5.0 specific gravity. The feed contained from 6% to 7% moisture. By diverting a flow of about 60 to 80 gallons per minute of pulp at 2.45 specific gravity, containing 27 to 36 T. P. H. magnetite solids, directly to the densifier as illustrated in the accompanying drawings, this excessive water was eliminated from the circuit without entailing a severe loss in magnetite. The amount of medium directly by-passed to the densifier was about 10% of the total medium in circulation. By means of the present invention, therefore, it was possible to compensate for the extra water in the feed without entailing severe economic losses. Moreover, if the feed with this amount of water had been treated in the manner in use before the advent of the present invention it would have been necessary to increase the capacity of the cleaning system by 75%.

Throughout the specification and claims where the word "ore" is used, it is to be understood that this expression includes other mineral products such as coal.

I claim:

1. In the method of separating mixtures of solid particles having different specific gravities which includes introducing an ore of varying and relatively high water content into a body of separatory fluid comprising a suspension in water of finely-divided medium solids, said fluid having an apparent density between those of the particles to be separated whereby a more dense fraction sinks and a less dense fraction floats, wherein said sink and float fractions are separately recovered and the medium solids carried therewith are drained therefrom and collected for reuse, and wherein the washings are subjected to a cleaning operation, said fluid medium having a concentration of water by volume sufficiently low and said ore having a water content sufficiently high so that the water removed by cleaning that portion of the medium passing over the washing screens is insufficient to compensate for the water introduced with the ore, the improvement which comprises: diverting and thickening a sufficient amount of the undersize from the drainage screen without cleaning to compensate for the water coming into the separatory fluid with said ore, removing a densified product from the thickening operation, and recycling said product directly to the separatory zone.

2. A method according to claim 1 wherein at least a portion of the float drainage screen undersize is subjected to the thickening operation.

3. A method according to claim 1 wherein the recovered solids from the washings together with the drainage screen undersize are thickened in the same operation.

4. A method according to claim 1 wherein the finely-divided medium solids are magnetizable medium solids.

5. A method according to claim 4 wherein the magnetizable solids in the drainage screen undersize are magnetized before being thickened and wherein the densified product is demagnetized before return to the separatory zone.

References Cited in the file of this patent

UNITED STATES PATENTS

| Number | Name | Date |
|---|---|---|
| 2,113,609 | Wuensch | Apr. 12, 1938 |
| 2,387,866 | Walker | Oct. 30, 1945 |